United States Patent

Locke et al.

[11] 3,817,606
[45] June 18, 1974

[54] MIRROR FOR HIGH POWER LASERS AND METHOD OF FABRICATING SAME

[75] Inventors: Edward V. Locke, Rockport; Richard A. Hells, Andover, both of Mass.

[73] Assignee: AVCO Everett Research Laboratory, Inc., Everett, Mass.

[22] Filed: Jan. 11, 1973

[21] Appl. No.: 322,783

[52] U.S. Cl. .............................. 350/310, 350/288
[51] Int. Cl. .............................................. G02b 5/08
[58] Field of Search ................... 350/310, 320, 288; 331/94.5; 163/168, 109; 219/121 EB, 121 L

[56] References Cited
UNITED STATES PATENTS

| | | | |
|---|---|---|---|
| 1,818,387 | 8/1931 | Dinzl | 163/68 |
| 3,637,296 | 1/1972 | McLafferty et al. | 350/310 |
| 3,731,992 | 5/1973 | Mansell | 350/310 |

OTHER PUBLICATIONS

Manko, H. Solders & Soldering, N.Y., McGraw–Hill, 1964, P. 215, TT267.M3.
Earvolino, L. P. et al., Laser Weilding of Aero–Space Structural Alloys, in Weilding Research Supplement: p. 133s, March 1966.

Primary Examiner—Ronald L. Wibert
Assistant Examiner—Michael J. Tokar
Attorney, Agent, or Firm—Charles M. Hogan; Melvin E. Frederick

[57] ABSTRACT

A laser mirror and method of fabricating same resistant to thermal distortions produced by radiative heating and/or heating by other processes associated with high power lasers. A thick metal block is separated into a thin face portion, an intermediate portion and a rear portion by a plurality of co-planar closely spaced intersecting coolant passages provided by drilling intersecting holes preferably at right angles to each other entirely through the block near one end. The intersecting holes form a plurality of spaced connector members or pillars in the intermediate portion integral with the face and rear portions. Coolant means including a manifold surrounding the holes is provided to permit coolant under pressure to be passed through the space defined by the holes.

5 Claims, 6 Drawing Figures

PATENTED JUN 18 1974  3,817,606

MIRROR FOR HIGH POWER LASERS AND METHOD OF FABRICATING SAME

This invention relates to laser mirrors and more particularly to laser mirrors subject to thermal distortion and arranged and adapted to resist thermal distortion detrimental to laser action.

With the advent of lasers has come the development in recent years of a braod array of laser systems for utilizing now well-known capabilities in many diverse applications and fields.

There has been much development in the laser art principally in recent years leading to higher power laser configurations. Gases such as neon, krypton, argon, helium and mixtures of these and others such as carbon dioxide and nitrogen have been shown to provide laser oscillation in a broad area of the electromagnetic spectrum. A wide range of gases and pressures are used in present-day lasers.

The mechanics of most gas lasers including flowing gas lasers are currently well-known. One type of gas laser which has received a great deal of attention is the nitrogen-carbon dioxide laser. In this type of gas laser, the nitrogen is excited to the first vibrational level, and it transfers energy into the upper laser level of carbon dioxide preferentially, so as to provide a population inversion which supports laser emission. The emission of photons by the carbon dioxide causes the molecules thereof to assume the energy of the lower laser level and molecules in this energy level rapidly decay via gas collisions to the ground state.

Thus, in the present state of the high power gas laser art, lasing (which is the coherent stimulated emission of quanta of light energy) of one substance results from that substance being brought to a high, non-equilibrium energy state as a result of collisions with an energizing gas excited to a vibrational energy level which closely matches an energy level of the lasing substance. The method of exciting the energizing gas may vary in accordance with the particular design parameters of a given laser. For instance, electric excitation may be used in any of several forms. One well-known form is radio frequency excitation; another form is direct current plasma excitation; and a third known form is microwave excitation. A fourth form utilizes an electron beam. Additionally, it is possible to excite the energizing gas by causing it to absorb intense light of a frequency matched to the spacing of the low-lying vibrational energy levels of the energizing gas.

For a further discussion of a laser capable of developing very high powers, see, for example, U.S. Pat. No. 3,577,096 issued May 4, 1971. See, also, U.S. Pat. application, Ser. No. 80,152 filed Oct. 12, 1970, now U.S. Pat. No. 3,713,030 and U.S. Pat. No. 3,702,973 and assigned to the same assignee as this application. U.S. Pat. No. 3,577,096 discloses a transverse discharge type high power flowing gas laser; U.S. Pat. application Ser. No. 80,152 of common assignment with the present invention discloses a gas laser wherein the gas is thermally heated and thereafter suddenly cooled by passing it through a rapid expansion nozzle to freeze the vibrational energy states; and U.S. Pat. No. 3,702,973 of common assignment with the present invention discloses a transverse discharge high power flowing gas device using an electron beam.

In the field of lasers, it has long been known that the alignment and optical figure of the mirrors are of critical importance in order to maintain maximum output. Frequently, laser mirrors after being correctly aligned and particularly mirrors used in chemical reaction and gas lasers wherein they are exposed to hot gases as described above are subjected to radiative and aerodynamic heating which cause misalignment and distortion.

If one surface of a laser mirror is exposed to a uniform heat flux resulting, for example, from radiative and/or aerodynamic heating, conduction produces a temperature gradient in the material normal to its exposed surface. In the absence of external restraint the differential thermal expansion results in spherical bending. Where a high quality optical system is required, surface distortion must not be greater than a small fraction of the wavelength of the radiation of, for example, about 10% at the most. In certain gas laser systems, distortion should be kept at a value less than preferably one, or at most, several microns. Gas lasers such as, for example, gas dynamic and electrically pumped $CO_2$ lasers are capable of extremely high output powers if mirror distortion does not limit obtainable power output.

Accordingly, it is an object of the present invention to provide an improved laser mirror.

It is another object of the present invention to provide a laser mirror that is resistant to misalignment resulting from thermal bending.

A further object of the present invention is to provide a laser mirror subjected to thermal stress during use that at least substantially maintains proper alignment throughout operation of the laser and a method of simply and economically fabricating the mirror.

A still further object of the present invention is to provide a laser mirror substantially unresistive to lateral expansion but resistive to distortion in the direction normal to the operative face of the mirror.

A still further object of the invention is to provide a laser mirror subjected to thermal stress during use that at least substantially maintains proper alignment during operation of the laser and that is simple and inexpensive to fabricate.

The novel features that are considered characteristic of the invention are set forth in the appended claims; the invention itself, however, both as to its organization and method of operation, together with additional objects and advantages thereof, will best be understood from the following description of a specific embodiment, when read in conjunction with the accompanying drawings, in which:

Figure 1:
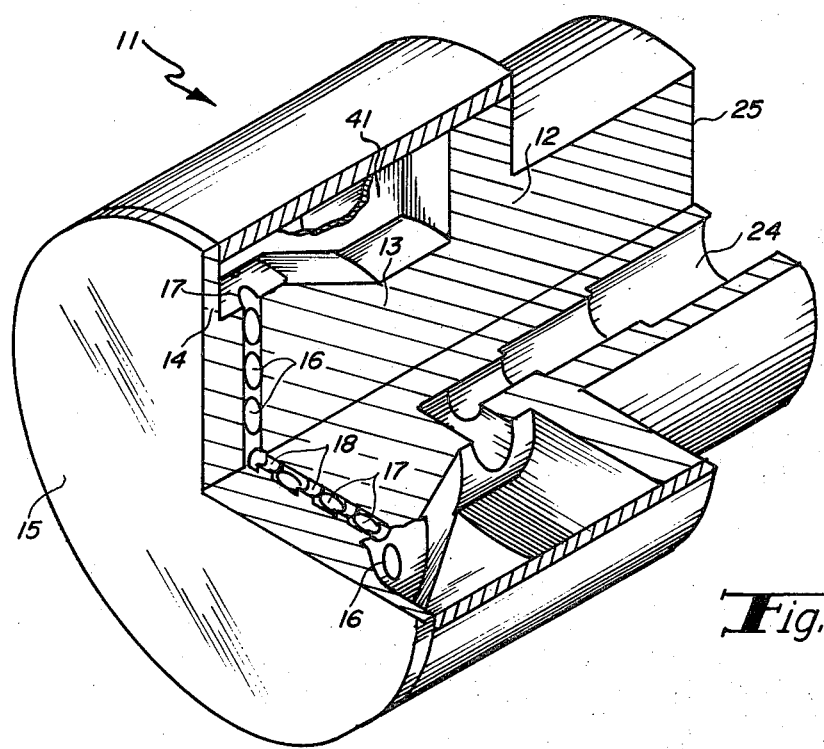
FIG. 1 is a perspective view with a portion broken away of a laser mirror in accordance with the invention.
Figure 2:
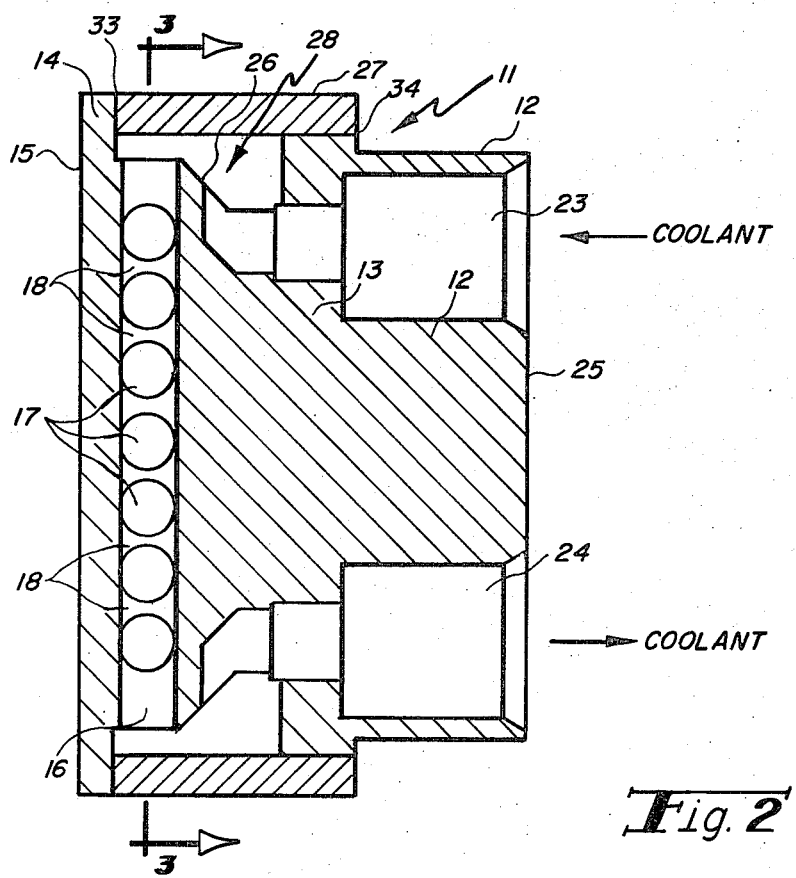
FIG. 2 is a cross-sectional side view of the mirror illustrated in FIG. 1.
Figure 3:
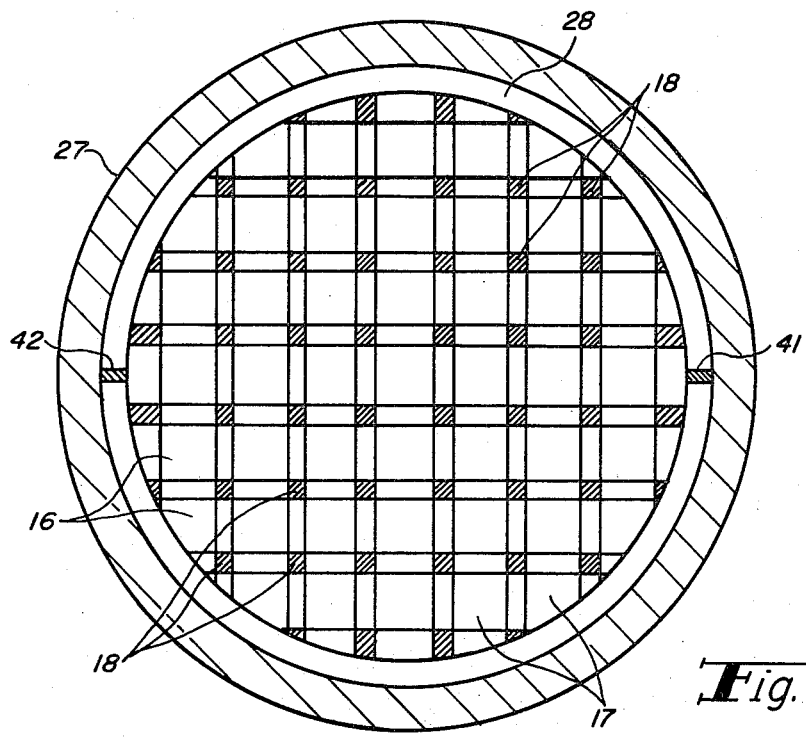
FIG. 3 is a cross-sectional end view taken on line 3—3 of FIG. 2.

Referring now to FIGS. 1, 2, 3, and 5 which illustrate one embodiment of a laser mirror in accordance with the present invention, there is shown an integral metal block member indicated generally by the reference numeral 11 comprising a relatively thick and rigid rear portion 12, a recessed intermediate portion 13 and an effectively thin face portion 14 having an exposed surface 15 which, when suitably processed, forms the mirror surface. The block member 11 is composed of a material that for the particular laser application is as stiff as possible, provides maximum heat conduction and permits provision on its exposed surface 15 of the necessary or desired optical surface. Suitable materials may range from the hard metals such as steel and the like to relatively soft metals such as copper and the like. The block member 11 for many lasers and especially $CO_2$ lasers is preferably formed of OHFC copper and/or a copper alloy having a hardness greater than about Rockwell B 30.

Figure 4:
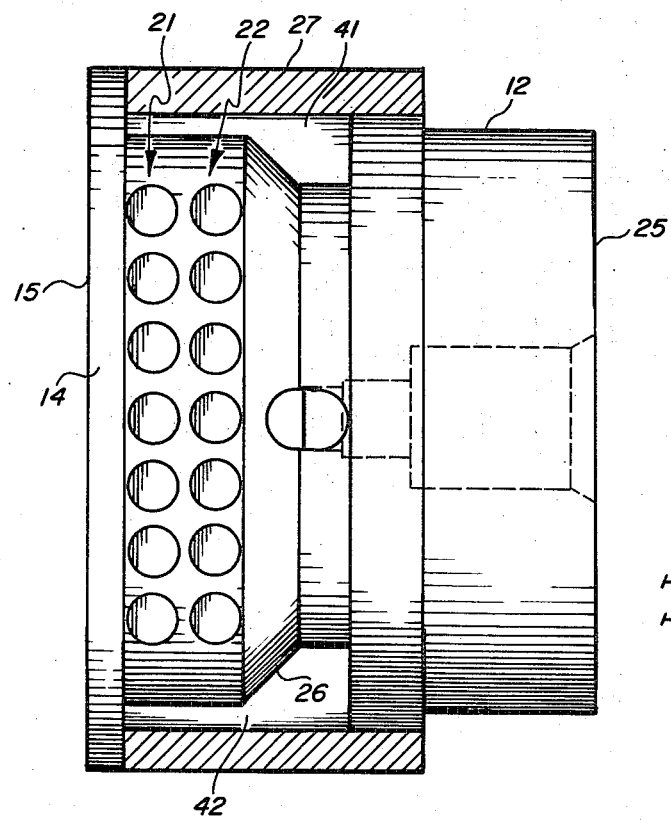
FIG. 4 is a side view with a portion broken away of another embodiment having two layers of intersecting coolant passages.

The block member 11 is conveniently circular in configuration and the intermediate portion recessed as by turning it on a lathe to facilitate mounting and the provision of a coolant manifold. Disposed a small distance below the reflective surface 15, the distance being typically determined by the mirror material and heat flux incident on the mirror, are two sets of closely spaced coolant passages 16 and 17 extending completely through the block member. The passages are of substantially the same cross section and lie in a common plane. The first set of passages 16 intersect the second set of passages 17, preferably at right angles. Inspection of FIGS. 2 and 3 will show that the formation of passages as disclosed above results in the simple and economical provision of a large number of small connector members or pillars 18 substantially uniformly spaced one from another rearward of substantially the entire exposed mirror surface 15. The connector members or pillars 18 are integral with and connect the face portion 14 to the balance of the block member. Where the heat flux incident on the mirror is moderate or low, the connector members 18 may be simply and inexpensively provided by drilling or boring co-planar and intersecting passages through the block member. Where connector members are required that are relatively long in the direction normal to the reflective surface 15 as typically required for high heat flux applications, appropriate passages may be formed by milling or the like to permit the passages parallel one with another, having the desired height and width, to be located substantially uniformly close to one another and provide the desired length and thickness of the connector members as illustrated by way of example in FIG. 6. Where relatively long connector members are not deemed necessary or desirable, one or more additional layers 21 and 22 of intersecting passages may be provided as illustrated in FIG. 4 if the rate of heat removal by one layer of intersecting passages is not adequate.

The rear portion 12 is conveniently provided with oppositely disposed relatively large coolant inlet and outlet passages 23 and 24 providing communication between the rear surface 25 of the block member and the peripheral surface 26 of the metal portion below the intersecting sets of passages 16 and 17.

Figure 5:
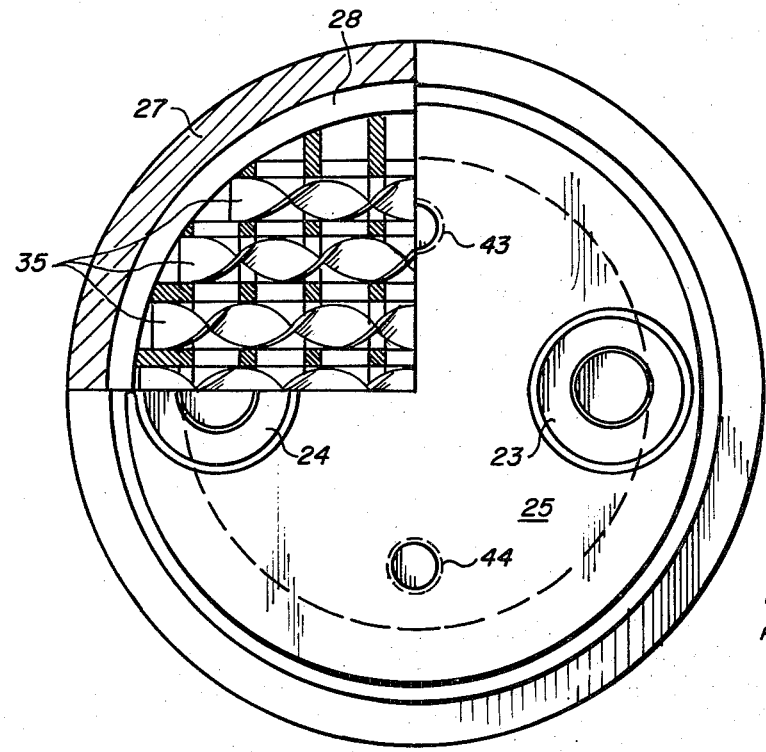
FIG. 5 is a rear end view with a portion broken away of the mirror illustrated in FIG. 1.

Surrounding the peripheral surface 26 of the intermediate portion 13 including the sets of passages 16 and 17, inlet passage 23 and outlet passage 24, is a relatively thin wall member 27 defining a coolant manifold 28. The wall member 27 is sealably attached to the face portion 14 as at 33 and to the intermediate portion 13 as at 34. To facilitate heat transfer from the mirror to coolant in the intersecting passages, loose fitting metal swirl inducer strips 35 as shown in FIG. 5 may be disposed in and extend the length of the set of passages parallel to the predominate direction of coolant flow in the mirror. The swirl inducer strips increase heat transfer by providing a higher Reynolds number of the flow as compared to that which would exist in their absence. The swirl inducer strips should have a loose fit in the coolant passages so that they will not interfere with flexing of the connector members or cause stressing in the mirror.

Figure 6:
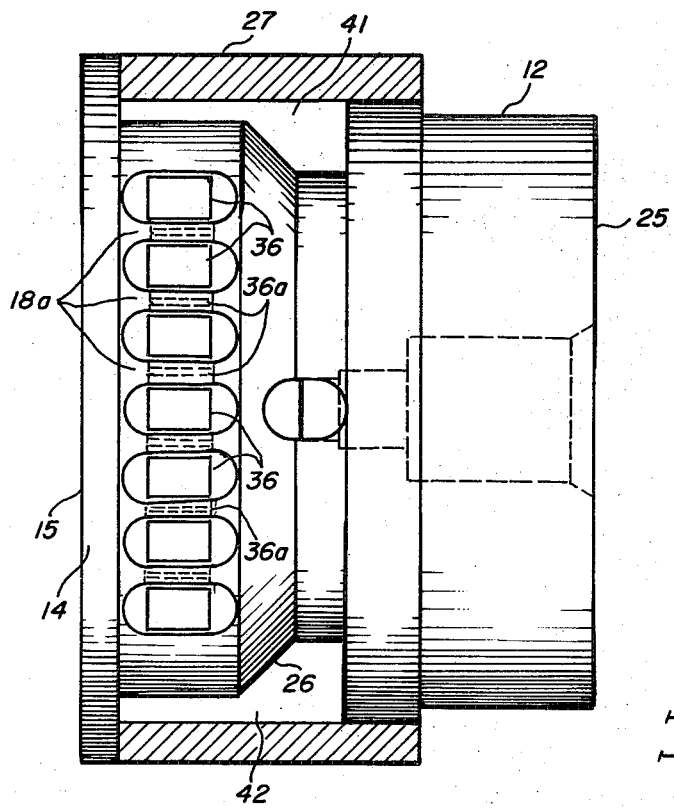
FIG. 6 is a side view with a portion broken away of a further embodiment having long connector members.

Referring now to FIG. 6, in the case of long connector members 18a, maximum heat transfer may be achieved by providing elongated loose fitting filler blocks 36 in the center portions of the passages parallel to the predominate direction of coolant flow and short loose-fitting filler blocks 36a disposed in the center portion of the intersecting passages intermediate adjacent elongated filler blocks.

Oppositely disposed baffles 41 and 42 are fixedly provided in the manifold intermediate the inlet and outlet passages 23 and 24 to prevent direct coolant flow through the manifold 28 and thereby force the coolant to flow from the inlet coolant passage 23 through the two sets of coolant passages 16 and 17 and out the outlet coolant passage 24. To prevent stresses resulting from expansion, the baffles 41 and 42 are sized to have a loose fit. The block member may be removeably attached to conventional and suitable mirror supporting means (not shown) as, for example, by providing threaded bolt holes 43 and 44 in the rear portion.

To facilitate formation of the optical surface, the face portion preferably is not composed of a soft metal. Accordingly, for $CO_2$ lasers and the like, OHFC copper or a copper alloy having a hardness greater than about Rockwell B 30 is preferred. To prevent annealing or softening, it is necessary that the wall member 27 be welded to the block member 11 without substantially changing the hardness of the copper. This may be accomplished by temporarily placing heat sink members (not shown) of substantial mass in contact with a substantial portion of the outer surface of the wall member 27 and electron beam or laser welding the wall member to the face portion and the rear portion to prevent leakage of coolant from the interior of the mirror. Electron beam, laser welding or the like is preferred because such results in minimum heat deposition (and, hence, annealing) in the block member. Copper, preferably at least about half-hardened OHFC copper (copper having a hardness greater than about Rockwell B 30) has been found particularly useful for fabricating mirrors for use in $CO_2$ lasers because a mirror surface having all of the required characteristics can be formed directly thereon and merely repolished as required, thereby obviating the necessity of first depositing acceptable reflective and/or protective coatings on the desired surface to provide the required mirror characteristics and then repeating this expensive and time-consuming procedure when the mirror surface requires maintenance.

When the exposed surface 15 is exposed to hot gas, laser radiation and the like during use, the connector members can bend or flex easily and thereby permit substantially free lateral thermal expansion of the face portion 14 without accompanying bending moments and shear. In combination with the rear portion 12, the connector members 18 substantially prevent bending of the face portion 14 in the direction normal to the surface 15. Provision of flow of a heat transfer fluid such as water through the space defined by the passages 16 and 17 permits the mirror, and especially the face portion, to be maintained at a constant and relatively low temperature thus preventing distortion.

It will now be seen that in accordance with the invention, thermal bending of the face portion is simply and economically reduced if not prevented by effectively making the face portion as thin as possible and supporting it from the rear by connector members 18 integral with the face portion 14 and with the rear portion 12, which rear portion has a stiffness much greater than that of the face portion, the connector members being substantially only flexible to lateral expansion of the face portion in the radial direction. This lack of resistance to expansion in the radial direction and resistance to expansion or movement in the axial direction is achieved by utilizing a very stiff rear portion in combination with a large number of uniformly spaced connector members having a relatively small cross section and which are integral with the face portion and the rear portion and are formed by drilling or boring intersecting passages through the metal forming the mirror adjacent the face portion of the mirror.

While the provision of loose fitting baffles 41 and 42 to force coolant to flow through the mirror facilitates and simplifies fabrication and assembly of a mirror, it is to be understood that they may be made integral with the block member. In this case, surface 26 may be formed by machining rather than by simply turning it on a lathe.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. In the method of fabricating a mirror for use in a laser, the steps comprising:
   a. providing in a thick integral metal block having a hardness greater than about Rockwell B 30 and a front face for providing a reflective surface and a rear face, a plurality of co-planar intersecting passages adjacent said front face and extending entirely through said metal block and spaced one from another to define a large number of connector members substantially uniformly spaced one from another over substantially all of said front face and having a cross-section permitting substantially free lateral thermal expansion of said front face;
   b. sealably attaching metal side wall member means to said metal block to define a coolant manifold in communication with the ends of each passage, said side wall member means being attached to the side portion of said block without substantially decreasing the said hardness of said block;
   c. providing baffle means between said side wall member and said block to separate said coolant manifold into an inlet coolant manifold and an outlet coolant manifold whereby coolant introduced into said inlet coolant manifold flows substantially only through said passages and into said outlet coolant manifold; and
   d. providing a coolant inlet passage in communication with the said inlet coolant manifold and a coolant outlet passage in communication with said outlet coolant manifold.

2. The method as defined in claim 1 comprising providing loose fitting baffle means and providing a metal block that is at least in part copper and welding said side wall member means to said metal block.

3. The method as defined in claim 2 comprising electron beam welding said side wall member means to said block, and removably providing heat sink means disposed in good thermal conducting contact with said side wall member means to remove heat therefrom during welding sufficient to prevent a substantial change in the hardness of said block.

4. The method as defined in claim 1 and additionally including providing in predetermined passages loose fitting means effective to increase the Reynolds number of coolant flowing through said passages.

5. The method as defined in claim 1 comprising providing said co-planar intersecting passages as a first set substantially uniformly spaced one from another and a second set substantially uniformly spaced one from another at substantially right angles to and passing through said first set of passages to define said plurality of connector members spaced one from another and forming an integral part of said block.

* * * * *

UNITED STATES PATENT OFFICE
CERTIFICATE OF CORRECTION

Patent No. 3,817,606     Dated June 18, 1974

Inventor(s) Edward V. Locke and Richard A. Hella

It is certified that error appears in the above-identified patent and that said Letters Patent are hereby corrected as shown below:

Please correct the name of one of the co-inventors from "Richard A. Hells" to read--Richard A. Hella--.

Signed and sealed this 1st day of October 1974.

(SEAL)
Attest:

McCOY M. GIBSON JR.
Attesting Officer

C. MARSHALL DANN
Commissioner of Patents